United States Patent [19]
Stedman

[11] 4,034,822
[45] July 12, 1977

[54] HITCH-STEERING, OSCILLATION AND DIFFERENTIAL SUPPORT FOR A MINING MACHINE OR THE LIKE

[75] Inventor: Robert N. Stedman, Chillicothe, Ill.

[73] Assignee: Caterpillar Tractor Co., Peoria, Ill.

[21] Appl. No.: 674,027

[22] Filed: Apr. 5, 1976

[51] Int. Cl.² .................................. B62D 59/00
[52] U.S. Cl. .......................... 180/51; 180/14B; 280/492
[58] Field of Search ............. 180/14 R, 14 A, 14 B, 180/11, 12, 51, 24.02, 53 R; 280/492

[56] References Cited
U.S. PATENT DOCUMENTS

| | | | |
|---|---|---|---|
| 3,189,117 | 6/1965 | Ammon | 180/51 |
| 3,253,671 | 5/1966 | Fielding | 180/51 |
| 3,473,619 | 10/1969 | Dion | 180/51 X |
| 3,630,302 | 12/1971 | Holland | 180/12 |
| 3,773,129 | 11/1973 | Anderson | 180/14 B |
| 3,831,693 | 8/1974 | King | 180/14 A |

Primary Examiner—Philip Goodman
Assistant Examiner—Terrance L. Siemens
Attorney, Agent, or Firm—Wegner, Stellman, McCord, Wiles & Wood

[57] ABSTRACT

A material handling vehicle is provided with an articulating and an oscillating hitch assembly between a tractor portion and a trailer portion thereof. The hitch assembly telescopes a pinion gear support or trunnion housing carried by a differential gear housing into an oscillation housing. The oscillation housing is pivotally connected to the tractor and permits the tractor to pivot about a generally vertical axis and to oscillate about a longitudinal axis of the housing, both oscillation and pivoting being relative to the trailer as the vehicle is propelled over a terrain. The telescoping of the pinion gear or trunnion housing and oscillation housing makes it possible to eliminate parts and effectively shorten the length of the vehicle without sacrificing any flexibility or strength in the hitch assembly between the tractor and the trailer.

8 Claims, 3 Drawing Figures

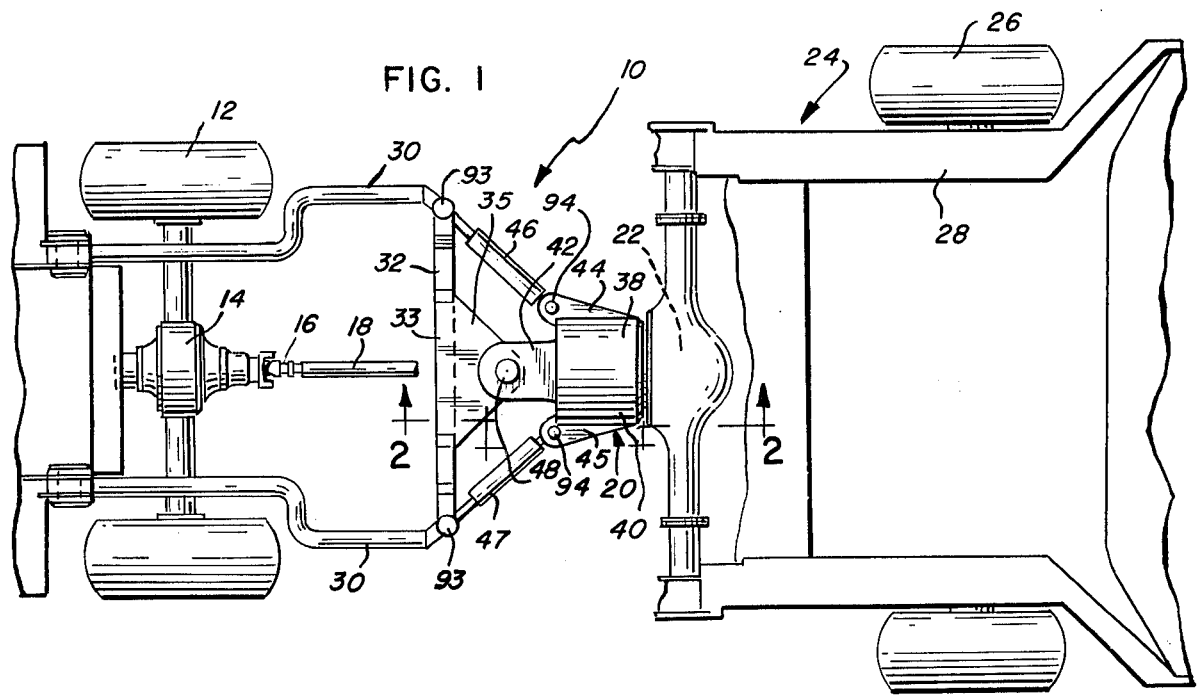

HITCH-STEERING, OSCILLATION AND DIFFERENTIAL SUPPORT FOR A MINING MACHINE OR THE LIKE

BACKGROUND OF THE INVENTION

1. Field of the Invention

This invention relates to material handling vehicles and, more particularly, to such vehicles having a steering and hitch assembly between a tractor portion and a trailer portion thereof.

2. Description of the Prior Art

There are in existence many material handling vehicles which employ a tractor for both pushing and pulling a trailer. One such vehicle would be a vehicle for use in a mine with low ceilings and limited area for maneuvering the vehicle wherein the operator is positioned on the tractor, facing sideways, and manipulates the tractor and trailer for loading and unloading the trailer through an articulating and oscillating hitch connection between the tractor and the trailer.

In current vehicles a support member projects from the trailer into the area between the tractor and the trailer and has, in the central portion thereof, an opening in which an oscillation housing is oscillatably mounted in a bearing. The housing is pivotally connected to the tractor and has the drive shaft that extends from the tractor passing therethrough for connection with the differential on the trailer. The oscillation housing is a yoke-like member and has structure on outwardly extending ears for connection to steering cylinders projecting from the tractor. Due to the type of mounting of the oscillation housing in the support member and the pivotal connection to the tractor, the tractor is permitted to oscillate about the axis of the drive shaft and pivot about an axis transverse to the oscillation axis, both oscillation and pivoting being relative to the trailer. An operator manipulates controls to elongate or foreshorten the steering cylinders, thereby turning the tractor and trailer relative to each other about the vertical axes of the pins. At the same time, as the vehicle traverses terrain, the tractor and trailer can oscillate relative to each other about the axis of the drive shaft.

The hitch assembly of current vehicles takes up considerable space and thereby requires the vehicle to be longer than may be desired. In mines and other areas where there is only limited space available for maneuverability, it is desirable to have the length of the vehicle as short as possible without sacrificing payload capacity of the trailer or engine capacity of the tractor.

SUMMARY OF THE INVENTION

A material handling vehicle has been devised which has a means for providing for articulation and oscillation in the hitch assembly which hitch assembly is shorter, more compact and more efficient than current designs. That is, the support member on the trailer and its attendant bearing is eliminated and the pinion gear support housing is telescoped within the oscillation housing with said gear support housing being fastened directly to the differential of the trailer. The oscillation housing encircles the pinion gear support housing and is rotatably mounted thereon so that the oscillation housing will oscillate about the common axis of the pinion, the pinion gear support housing and the oscillation housing. The oscillation housing is connected to the tractor by spaced apart pins so as to permit turning of the tractor relative to the trailer about the axes of the pins. A pair of steering cylinders engage with ears on the oscillation housing so as to effect turning of the tractor relative to the trailer. Since the oscillation housing is free to oscillate relative to the gear support housing, it is possible for the tractor to oscillate relative to the trailer about the axis of the pinion gear. In this way, a vehicle with all the flexibility of the prior devices is provided with a hitch assembly that is shorter and more compact, thereby making it possible to shorten the length of the vehicle. The hitch assembly is such as to eliminate a number of parts and structural members without sacrificing efficiency or maneuverability. Accordingly, an improved hitch assembly is provided which permits both oscillation and articulation between the tractor and trailer over a shorter overall wheel base of the vehicle.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a top view of a material handling vehicle of the type proposed incorporating a preferred form of the present invention;

FIG. 2 is an enlarged view taken along the lines 2—2 of FIG. 1 with the steering cylinder removed; and, FIG. 3 is an enlarged cross-sectional view with some parts shown broken away and in section, said view being taken on the horizontal plane substantially through the midportion of the improved hitch assembly.

DESCRIPTION OF THE PREFERRED EMBODIMENT

Figure 3:
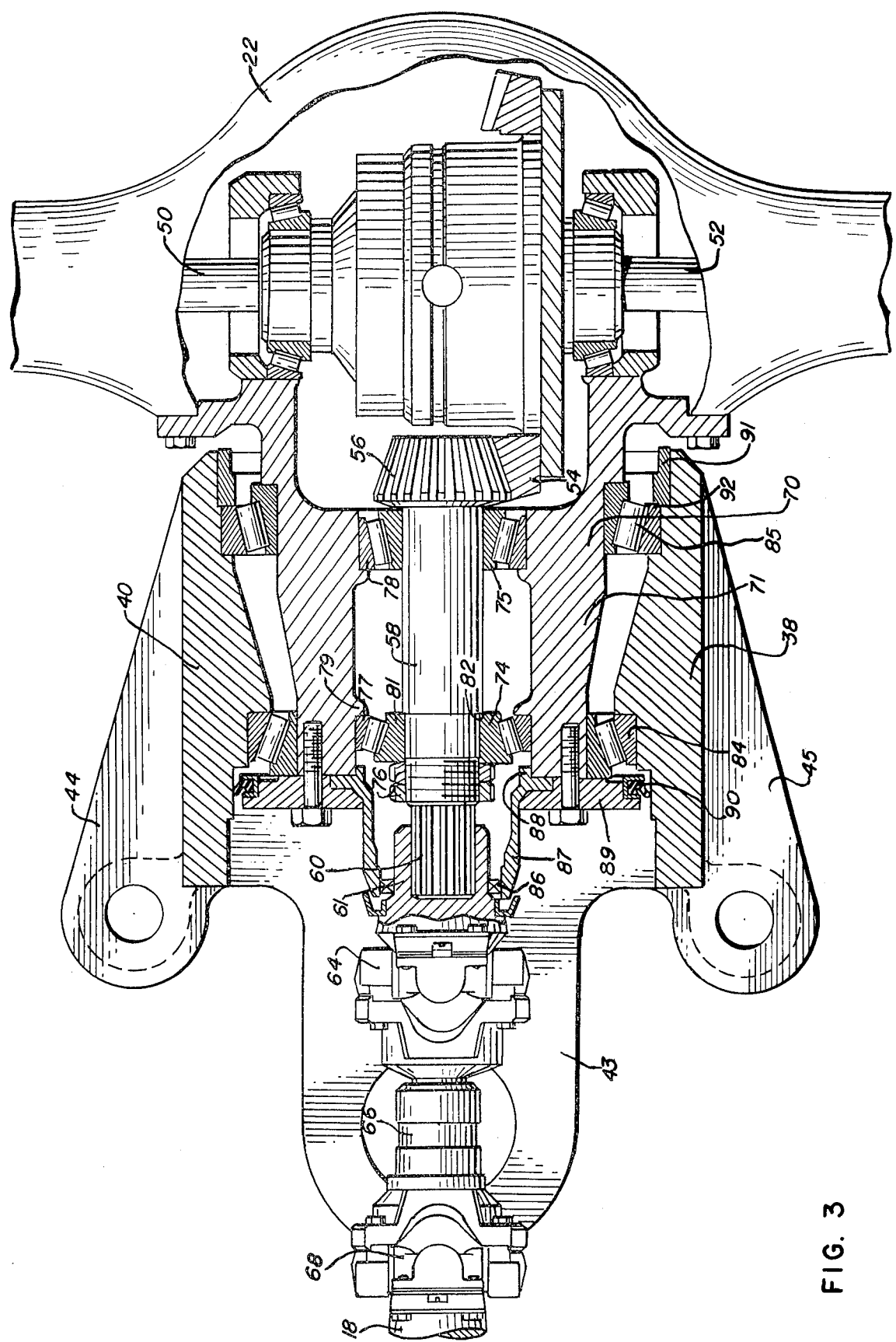

Referring to the drawings and, in particular, to FIG. 1, a tractor 10 is shown mounted for movement on wheels 12 and has the output of a transmission 14 connected to a universal coupling at 16. A portion of a drive line 18 extends rearwardly from the coupling 16 through the hitch assembly 20 for driving the gears in the differential 22 carried by the trailer 24 which is mounted on wheels 26. The trailer 24 has an outer bowl 28 and a scraper (not shown). The trailer 24 is operated in the usual fashion which is well-known in the art. The tractor 10 has a pair of side frames 30 connected together by means of the structural frame member 32. The frame member 32 is divided at the midportion into an upper part 33 and a lower part 34 so as to bridge and span the area where the drive line 18 extends. The upper part 33 and the lower part 34 of the frame member 32 rigidly support a pair of vertically spaced apart tongue members 35,36 which have vertically aligned openings 37 therethrough.

The hitch assembly 20 has an oscillation housing 38 which includes a body portion 40 with a centrally disposed pair of outwardly extending, vertically spaced apart tongues 42,43 and a pair of laterally extending ears 44,45. The ears 44,45 are connected to the lower portion of the body 40 of housing 38 with FIG. 2 illustrating ear 45 so connected. A pair of steering cylinders 46,47 are connected to the outer ends of the frame member 32 and to the ears 44,45 on the housing 38. In FIG. 2 the end of cylinder 47 is shown in phantom connected to ear 45. The oscillation housing 38 of the hitch assembly 20 is pivotally connected to the tractor 10 by means of vertically spaced apart pins 48,49 passing through the tongue members 35,36 on the tractor 10 and the tongues 42,43 on the oscillation housing 38 and is rotatably mounted with respect to the differential 22 in a manner to be described hereinafter.

Referring more specifically to FIG. 3, and occasionally to FIG. 2, the differential 22 is shown broken away with the drive lines 50 and 52 connected through the gear 54 to the gear 56 carried by the gear pinion 58. The gear pinion 58 and splines 60 on the outer end portion thereof which splines engage in the splined portion 61 of the universal joint or coupling 64. The coupling 64 is connected through the stub shaft 66 to a second universal joint or coupling 68 which, in turn, is connected to the one end portion of the drive line 18 projecting rearwardly from the tractor 10.

A pinion gear support housing or trunnion housing 70 is bolted to the differential 22 and has an outwardly extending cylindrical sleeve portion 71 encircling the gear pinion 58. The pinion 58 is rotated about its longitudinal axis within the pinion gear support housing or trunnion housing 70 and is supported for such rotation by means of the spaced apart bearing 74,75 extending between said pinion gear support housing 70 and said pinion 58. The pinion 58 is axially positioned relative to the support housing 70 by means of the lock nuts 76 being threaded on the threaded portion of the pinion 58 for locking the outer raceways 77,78 of the bearings 74,75 against shoulders 79 on the support housing. The bearing 74 has an inner raceway 81 bearing against a shoulder 82 formed on the pinion 58.

The oscillation housing 38 of the hitch assembly 20 has said body portion 40 telescoping over and encircling the sleeve portion 71 of the support housing 70 and is free to rotate relative to the support housing 70 by means of axially spaced apart bearings 84,85 extending between said oscillation housing 38 and support housing 70. A seal 86 is held in engagement between the splined portion 61 of the coupling 64 and a sleeve 87 which has a flange 88 nesting in the opening in the projecting end of the support housing 70. The sleeve 87 is held in position relative to the support housing 70 by means of the retaining ring 89 which is bolted to the end of the support housing. A seal 90 is mounted on the outer periphery of the retaining ring 89 and bears against the interior of the oscillation housing 38 so as to seal the area occupied by the various bearings. A retaining sleeve 91 is pressed into the rear opening of the oscillation housing 38 and bears against the outer raceway 92 of the bearing 85. The angled bearings 84,85 are retained between the oscillation housing 38 and the support housing 70 so that axial thrust loads are transmitted from the tractor 10 to the trailer 24 through the oscillation housing 38 to the support housing or trunnion housing 70. The bearings 84,85 will permit oscillation of the oscillation housing 38 relative to the support housing 70 and relative to the differential 22 upon which the support housing 70 is mounted.

The steering cylinders 46,47 are connected at one end by means of pivot pins 93 to the frame member 32 and are mounted at the other end by means of pivot pins 94 to the ears 44,45 of the oscillation housing 38 of the hitch assembly 20. The steering cylinders 46,47 are connected through appropriate controls to the operator's controls on the tractor. The vertically spaced apart tongues 42,43 of the oscillation housing 38 are aligned with the spaced apart tongues 35,36 on the frame member 32. The vertically spaced apart, axially aligned pivot pins 48,49 pass through the superimposed tongues on the oscillation housing 38 and of the frame member so that the trailer 24 and tractor 10 can pivot relative to each other about the axes of the pivot pins 48,49.

From the above, it can be seen that the tractor 10 and trailer 24 can move or pivot relative to each other about the axes of the pivot pins 48,49 which relative movement can be accomplished by elongating and/or foreshortening the steering cylinders 46,47 so as to cause the trailer to rotate about said axes of the pivot pins to thereby effect a change in alignment between the tractor and the trailer. Since the oscillation housing 38 of the hitch assembly 20 is free to oscillate about the common axis of the oscillation housing 38 and the support housing 70, any tendency for the tractor to tilt in one direction will not be transmitted to the trailer, since the oscillation housing 38 will oscillate with the tractor relative to the support housing 70, the differential 22 and the trailer 24. In a like manner, as the trailer 24 and tractor 10 move over terrain and, in particular, rough terrain, it is possible for the tractor to pitch in one direction while the trailer is pitching in the opposite direction. This presents no problem because the connection between the tractor and the trailer through the hitch assembly 20 is such as to not transmit such twisting from one to the other.

The effect of my invention is to eliminate the special support bar provided previously on the trailer which extended into the area between the tractor and the trailer and supported an oscillation housing which was connected through steering cylinders on the tractor. The support member can be removed and the oscillation housing rotatably mounted on the support housing carried by the differential. By providing adequate bearings between the oscillation housing and the support housing, the oscillation housing is permitted to oscillate relative to the support housing. The universal couplings 64,68 permit drive from the tractor through the hitch assembly and gear pinion for driving the elements of the trailer. The universal couplings will account for any misalignment between the drive shaft and the gear pinion 58 no matter how extreme the relative pitch and turn is between the tractor and the trailer.

I claim:

1. A vehicle having a tractor portion and a trailer portion, a differential housing mounted on said trailer portion, a trunnion housing fastened directly to said differential housing, said trunnion housing being cylindrical in shape and projecting along an axis transverse to the axis of the differential housing, an oscillation housing encircling said trunnion housing and being rotatably mounted on said trunnion housing, said oscillation housing having a pair of outwardly extending vertically spaced apart tongues and a pair of horizontally spaced apart ears, a pair of vertically spaced apart tongues carried by said tractor and being pivotally connected to said tongues on said oscillation housing to permit pivotal movement between the tractor and trailer about the vertical axes of said pivotal connection, a pair of steering cylinders having one end of each mounted in spaced apart relationship on said tractor, the other end of each steering cylinder being connected to one of said ears on said oscillation housing whereby actuation of said steering cylinders pivots the tractor relative to the trailer about the vertical axes of the pivotal connection while permitting oscillation of the tractor relative to the trailer about the longitudinal axis of the trunnion housing and the oscillation housing.

2. A vehicle as claimed in claim 1 wherein said oscillation housing is supported on said trunnion housing by a pair of thrust bearings for rotation about a longitudinal axis that is common to the oscillation housing and the trunnion housing.

3. A vehicle as claimed in claim 1 wherein a power train from an engine on the tractor to a differential gear in the differential housing on the trailer has a pair of universal couplings in the vicinity of the pivotal connection.

4. In an articulated vehicle having a tractor portion and a trailer portion pivotally and oscillatably connected together, a differential mounted on said trailer portion, a housing directly fastened to said differential, said housing being cylindrical in shape and projecting transverse to the axis of the differential, an oscillation housing encircling said first-named housing and being rotatably mounted on said first-named housing, said oscillation housing having tongue means outwardly extending therefrom and ear means sidewardly extending therefrom, said tractor having tongue means aligned with and pivoted to said tongue means on said oscillation housing to permit pivotal movement between the tractor and trailer, elongating steering means extending from the tractor and being connected to said ear means on said oscillation housing whereby actuation of said steering means pivots the tractor relative to the trailer while permitting oscillation of the tractor relative to the trailer about the longitudinal axis of the first-named housing and the oscillation housing.

5. In an articulated vehicle as claimed in claim 4 wherein said first-named housing is telescoped within said oscillation housing with thrust bearings therebetween to permit said oscillation housing to oscillate relative to said first-named housing along a longitudinal axis common to both said housings.

6. In an articulated vehicle as claimed in claim 4 wherein said tongue means on the oscillation housing comprises a pair of vertically spaced apart members projecting toward said tractor, and said tongue means on said tractor comprise a pair of vertically spaced apart members projecting toward said oscillation housing, and a pair of vertically spaced apart pins threaded through said respective tongue means to form the pivot between said respective tongue means.

7. In an articulated vehicle having a tractor portion and a trailer portion pivotally and oscillatably connected together, a differential mounted on said trailer portion, a housing fastened to said differential, said housing being cylindrical in shape and projecting transverse to the axis of the differential, an oscillation housing encircling said first-named housing and being rotatably mounted on said first-named housing, said oscillation housing having tongue means outwardly extending therefrom and ear means sidewardly extending therefrom, said tractor having tongue means aligned with and pivoted to said tongue means on said oscillation housing to permit pivotal movement between the tractor and trailer, elongating steering means extending from the tractor and being connected to said ear means on said oscillation housing whereby actuation of said steering means pivots the tractor relative to the trailer while permitting oscillation of the tractor relative to the trailer about the longitudinal axis of the first-named housing and the oscillation housing and said mounting between said oscillation housing and said first-named housing is a pair of thrust bearings whereby loads from and to the tractor and the trailer are transmitted from one housing to the other housing.

8. In an articulated vehicle having a tractor portion and a trailer portion connected together, a differential on said trailer portion, a trunnion housing directly fastened to said differential, an oscillation housing encircling said trunnion housing and being rotatably mounted on said trunnion housing, and means for supporting said oscillation housing with respect to said tractor portion for pivotal movement about a generally vertical axis whereby said tractor oscillates and pivots relative to said trailer.

* * * * *